United States Patent
Sakai

(10) Patent No.: US 11,628,504 B2
(45) Date of Patent: Apr. 18, 2023

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Kohei Sakai, Dusseldorf (DE)

(73) Assignee: KYOCERA Corporation, Kyoto (JP)

( * ) Notice: Subject to any disclaimer, the term of this patent is extended or adjusted under 35 U.S.C. 154(b) by 210 days.

(21) Appl. No.: 16/962,711

(22) PCT Filed: Jan. 23, 2019

(86) PCT No.: PCT/JP2019/002088
§ 371 (c)(1),
(2) Date: Jul. 16, 2020

(87) PCT Pub. No.: WO2019/146645
PCT Pub. Date: Aug. 1, 2019

(65) Prior Publication Data
US 2020/0353541 A1    Nov. 12, 2020

(30) Foreign Application Priority Data

Jan. 23, 2018  (JP) .............................. JP2018-008807
Apr. 16, 2018  (JP) .............................. JP2018-078366

(51) Int. Cl.
*B23B 27/16*    (2006.01)
*B23B 1/00*     (2006.01)
(Continued)

(52) U.S. Cl.
CPC ............ *B23B 27/1611* (2013.01); *B23B 1/00* (2013.01); *B23B 27/143* (2013.01);
(Continued)

(58) Field of Classification Search
CPC ...... B23B 2200/0447; B23B 2200/081; B23B 2200/321; B23B 27/143; B23B 27/1611; B23B 1/00
See application file for complete search history.

(56) References Cited

U.S. PATENT DOCUMENTS 4,056,871 A * 11/1977 Bator .................... B23B 27/143
                                                      407/114
4,087,193 A *  5/1978 Mundy ................... B23B 51/02
                                                      407/114

(Continued)

FOREIGN PATENT DOCUMENTS

CN    103008702 A    4/2013
DE      3334414 A *  4/1984 ........... B23B 27/143
(Continued)

*Primary Examiner* — Sara Addisu
(74) *Attorney, Agent, or Firm* — Volpe Koenig

(57) ABSTRACT

A cutting insert may include a first surface, a second surface and a third surface. The first surface may include a corner having a convex curvilinear shape and an inclined surface. The inclined surface may include a first inclined surface, a second inclined surface and a third inclined surface. The first inclined surface may be inclined at a first angle. The second inclined surface may be inclined at a second angle. The third inclined surface may be inclined at a third angle. The first inclined surface may have a concave curvilinear shape in a cross section orthogonal to a bisector of the corner. The second inclined surface may be a flat surface. The second angle may be smaller than either of the first angle and the third angle in a cross section which includes the bisector and is orthogonal to the reference plane.

20 Claims, 18 Drawing Sheets

(51) Int. Cl.
*B23B 27/22* (2006.01)
*B23B 27/14* (2006.01)

(52) U.S. Cl.
CPC . *B23B 2200/0447* (2013.01); *B23B 2200/081* (2013.01); *B23B 2200/321* (2013.01)

(56) References Cited

U.S. PATENT DOCUMENTS

| | | | | |
|---|---|---|---|---|
| 4,367,990 | A * | 1/1983 | Porat | B23B 27/143 407/115 |
| 4,507,024 | A * | 3/1985 | Stashko | B23B 27/143 407/114 |
| 4,915,548 | A * | 4/1990 | Fouquer | B23B 27/143 407/114 |
| 5,116,167 | A * | 5/1992 | Niebauer | B23B 27/143 D15/139 |
| 5,122,017 | A * | 6/1992 | Niebauer | B23B 27/143 407/115 |
| 5,123,788 | A * | 6/1992 | Friederichs | B23B 27/143 407/116 |
| 6,848,868 | B2 * | 2/2005 | Kasperik | B23B 27/143 407/115 |
| 9,120,153 | B2 * | 9/2015 | Park | B23B 27/141 |
| 2007/0160433 | A1 * | 7/2007 | Lee | B23B 27/141 407/115 |
| 2013/0064613 | A1 * | 3/2013 | Krishtul | B23B 27/143 407/115 |
| 2015/0043982 | A1 * | 2/2015 | Tensaka | B23B 27/143 407/114 |
| 2015/0078844 | A1 * | 3/2015 | Majima | B23B 27/1607 407/114 |
| 2015/0090080 | A1 * | 4/2015 | Sakai | B23B 27/143 407/100 |
| 2016/0339524 | A1 * | 11/2016 | Yamaguchi | B23B 27/143 |
| 2016/0339525 | A1 * | 11/2016 | Matsuda | B23B 27/143 |
| 2019/0009345 | A1 * | 1/2019 | An | B23B 27/143 |
| 2019/0247929 | A1 * | 8/2019 | Pecina | B23B 27/141 |
| 2021/0008637 | A1 * | 1/2021 | Nagae | B23B 27/20 |

FOREIGN PATENT DOCUMENTS

| | | | | |
|---|---|---|---|---|
| DE | 3332821 | A * | 5/1984 | ........... B23B 27/143 |
| JP | 2000-153401 | A | 6/2000 | |
| JP | 2015-208793 | A | 11/2015 | |
| WO | 2015/119258 | A1 | 8/2015 | |

\* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2019/002088, filed on Jan. 23, 2019, which claims priority to Japanese Application No. 2018-008807, filed on Jan. 23, 2018 and No. 2018-078366, filed on Apr. 16, 2018, which are entirely incorporated herein by reference.

TECHNICAL FIELD

The present disclosure generally relates to cutting inserts for use in a cutting process. Specifically, the present disclosure relates to cutting tools for use in a turning process, such as external machining and internal machining.

BACKGROUND

An indexable cutting insert is discussed in Japanese Unexamined Patent Application Publication No. 2000-153401 (Patent Document 1) as a cutting insert for use in a cutting process of a workpiece, such as metal. Patent Document 1 may discuss the cutting insert whose upper surface includes a flat surface and a curved surface in order from a corner part toward a center.

SUMMARY

A cutting insert in a non-limiting embodiment may include a first surface, a second surface and a third surface. The first surface may include a corner, a first side and a second side. The corner may have a convex curvilinear shape in an outward direction. The first side and the second side may be individually extended from the corner. The second surface may be located on a side opposite to the first surface. The third surface may be located between the first surface and the second surface. An imaginary plane, which is orthogonal to a central axis passing through a center of the first surface and a center of the second surface and is located between the first surface and the second surface, may be taken as a reference plane. The first surface may further include an inclined surface that approaches the reference plane as going away from the corner.

The inclined surface may include a first inclined surface, a second inclined surface and a third inclined surface. The first inclined surface may be inclined at a first angle. The second inclined surface may be located more away from the corner than the first inclined surfaced, and may be inclined at a second angle. The third inclined surface may be located more away from the corner than the second inclined surface, and may be inclined at a third angle. The first inclined surface may have a concave curvilinear shape in a cross section orthogonal to a bisector of the corner. The second inclined surface may be a flat surface. The second angle may be smaller than either of the first angle and the third angle in a cross section which includes the bisector of the corner and is orthogonal to the reference plane.

EMBODIMENTS

Figure 1:
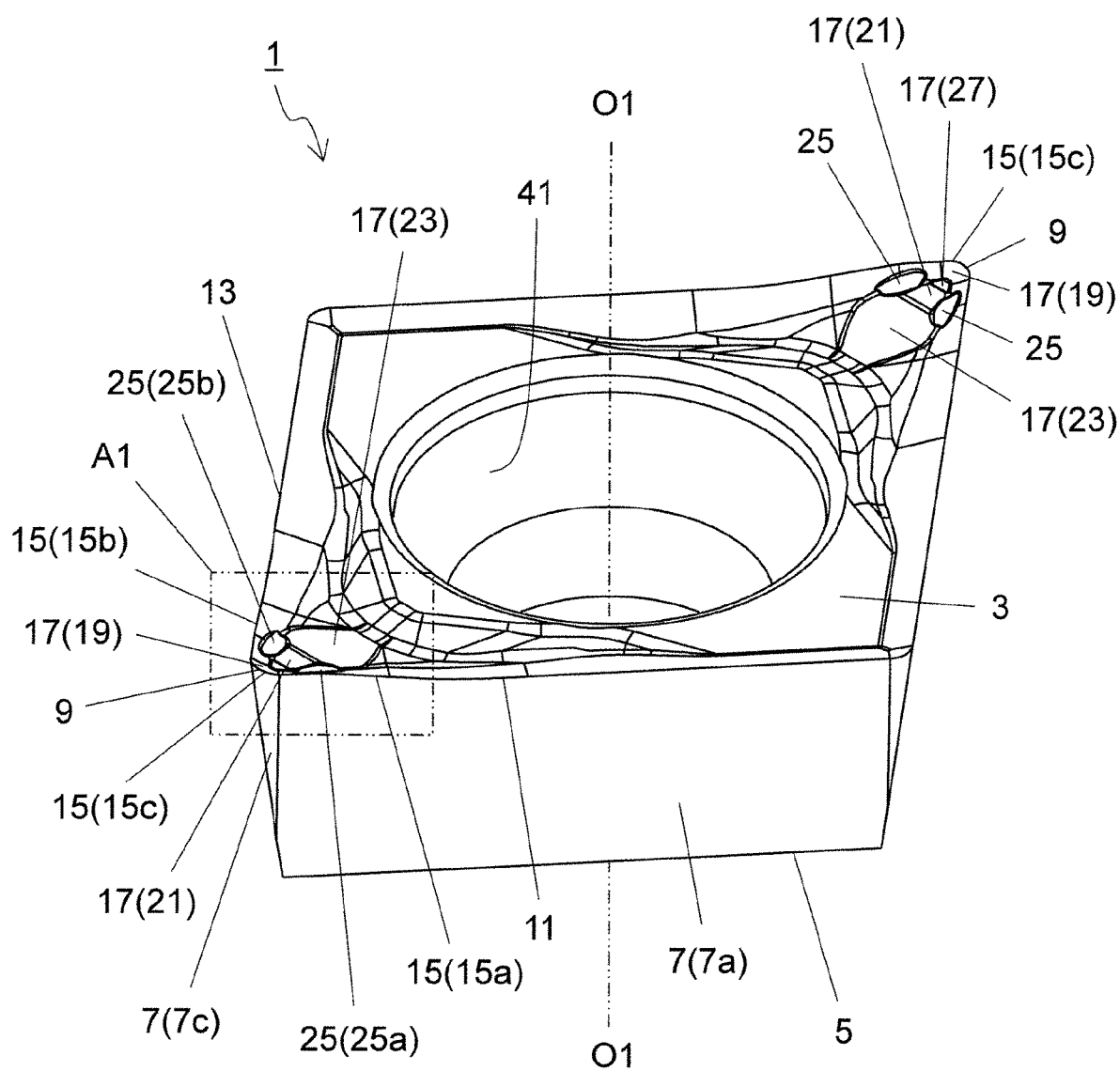
FIG. 1 is a perspective view illustrating a cutting insert in a non-limiting embodiment.

Examples of workpieces cut out in a cutting process may include carbon steel, alloy steel, stainless steel, aluminum, cast iron and non-ferrous metal. Of these workpieces, for example, aluminum or the like may be soft and chips may be therefore likely to be extended, and the chips may be likely to be welded on the cutting insert. Hence with the cutting insert described in Patent Document 1, chips may be extended excessively depending on the kind of the workpiece. Therefore, it has been difficult to stably control the chips.

The cutting inserts 1 (hereinafter also referred to simply as "inserts 1") in non-limiting embodiments may be described in detail below with reference to the drawings. For the sake of description, the drawings referred to in the following may illustrate, in simplified form, only main members necessary for describing the non-limiting embodiments. The cutting inserts 1 may therefore be capable of including any arbitrary structural member not illustrated in the drawings referred to in the present disclosure. Dimensions of the members in each of the drawings faithfully may represent neither dimensions of actual structural members nor dimensional ratios of these members.

A cutting process can be carried out using a cutting tool including the insert 1 in a non-limiting embodiment. Examples of the cutting tool may include a turning tool and a milling tool.

<Inserts>

The insert 1 in a non-limiting embodiment may include a first surface 3, a second surface 5 and a third surface 7. The second surface 5 may be located on a side opposite to the first surface 3. The third surface 7 may be located between the first surface 3 and the second surface 5. The first surface 3 may have a polygonal shape in the present disclosure. The first surface 3 may have a quadrangular shape as illustrated in FIG. 1. Similarly to the first surface 3, the second surface 5 may have a polygonal shape.

The second surface 5 may have the same size as the first surface 3, or alternatively may be smaller than the first surface 3. The second surface 5 may be similar to the first surface 3 in shape, or may be slightly smaller than the first surface 3. The insert 1 may have a polygonal plate shape in the non-limiting embodiment illustrated in FIG. 1. Usually, the first surface 3 may be an upper surface, the second surface 5 may be a lower surface, and the third surface 7 may be a side surface.

Figure 2:
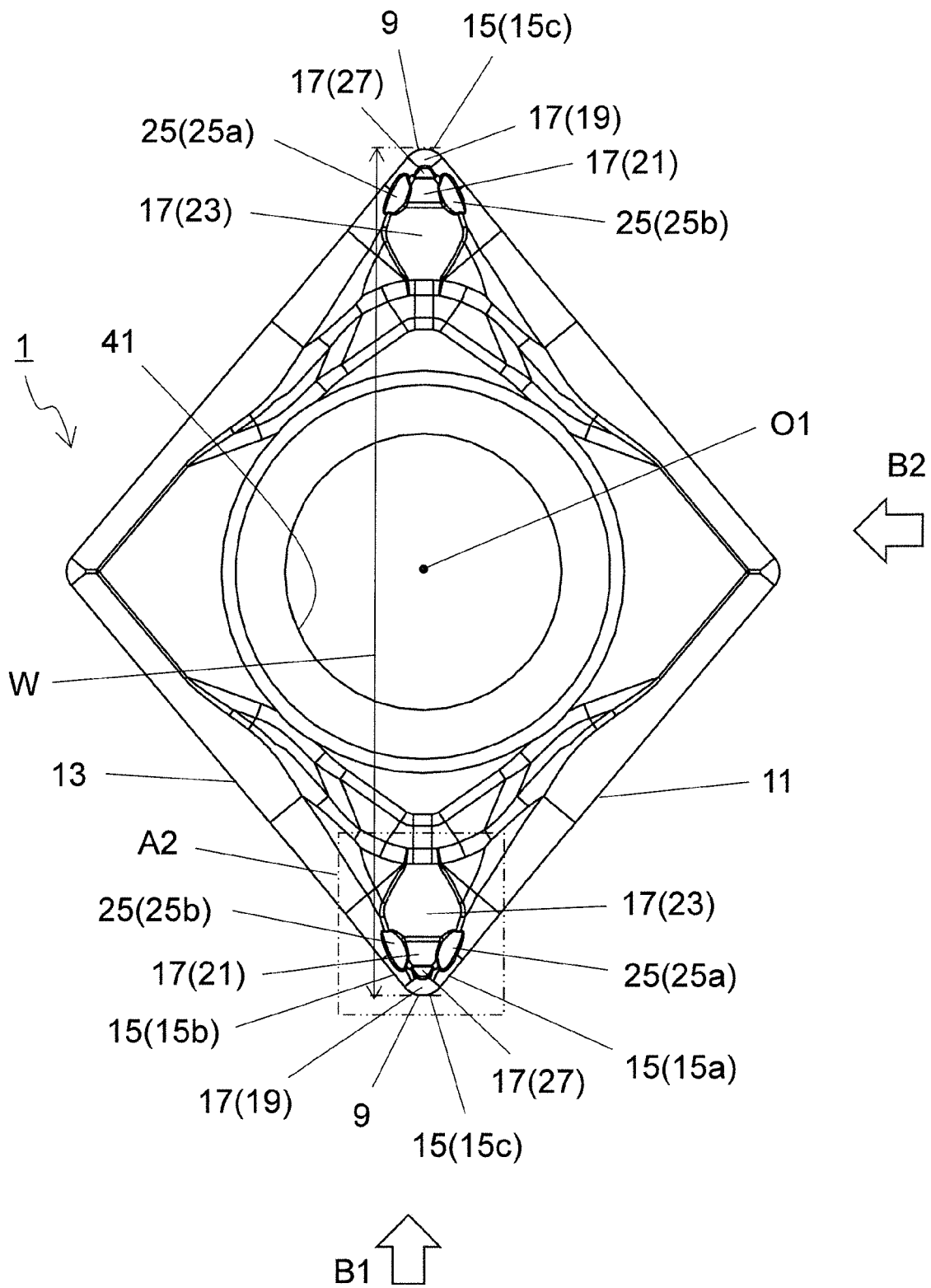
FIG. 2 is a plan view of the cutting insert illustrated in FIG. 1.

An imaginary straight line passing through a center of the first surface 3 and a center of the second surface 5 may be taken as a central axis O1. The first surface 3 may have a 180° rotational symmetric shape on the basis of the central axis O1 as illustrated in FIG. 2. The shape of the insert 1 is not limited to the above configuration. There is no problem even if the first surface 3 has, for example, a triangular or hexagonal shape.

The first surface 3 may include a corner 9, a first side 11 and a second side 13 in the present disclosure. The first side 11 and the second side 13 may be individually extended from the corner 9. In other words, the corner 9 may be located between the first side 11 and the second side 13.

Figure 3:
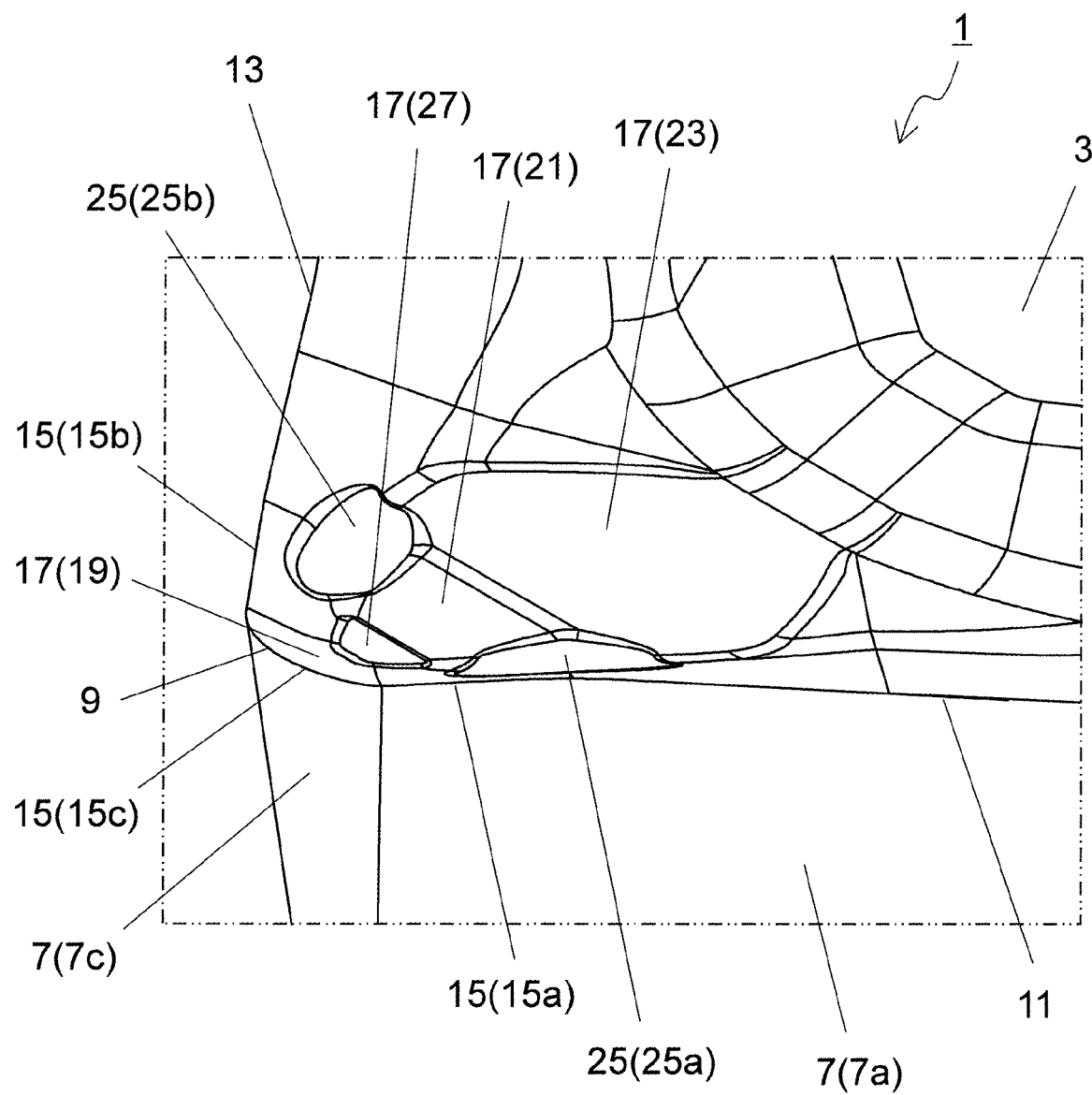
FIG. 3 is an enlarged view of a region A1 illustrated in FIG. 1.

The corner 9 may have a convex curvilinear shape in an outward direction in the non-limiting embodiment illustrated in FIG. 3. A radius of curvature of the corner 9 having the convex curvilinear shape may be kept constant or changed in a plan view of the first surface 3, namely, in a top view of the first surface 3. The corner 9 in the insert 1 may have a circular arc shape whose radius of curvature is kept constant in the top view in a non-limiting embodiment illustrated in FIG. 4.

The first side 11 and the second side 13 on the first surface 3 may have visually an approximately straight line shape, and need not have a strict straight line shape as a whole. Each of the first side 11 and the second side 13 may include a straight line shaped portion on at least a part connecting to the corner 9. Alternatively, the first side 11 and the second side 13 on the first surface 3 may have, for example, a slightly curved convex or concave shape.

The third surface 7 located between the first surface 3 and the second surface 5 may be in connection with each of the first surface 3 and the second surface 5 in the non-limiting embodiment illustrated in FIG. 1. Because the first surface 3 has the polygonal shape in the non-limiting embodiment illustrated in FIG. 1, the third surface 7 may include a plurality of surface regions respectively connecting to individual sides and the corners 9 on the first surface 3. The third surface 7 may include a first side surface 7a, a second side surface 7b and a corner side surface 7c as the plurality of surface regions in a non-limiting embodiment illustrated in FIG. 6.

Figure 6:
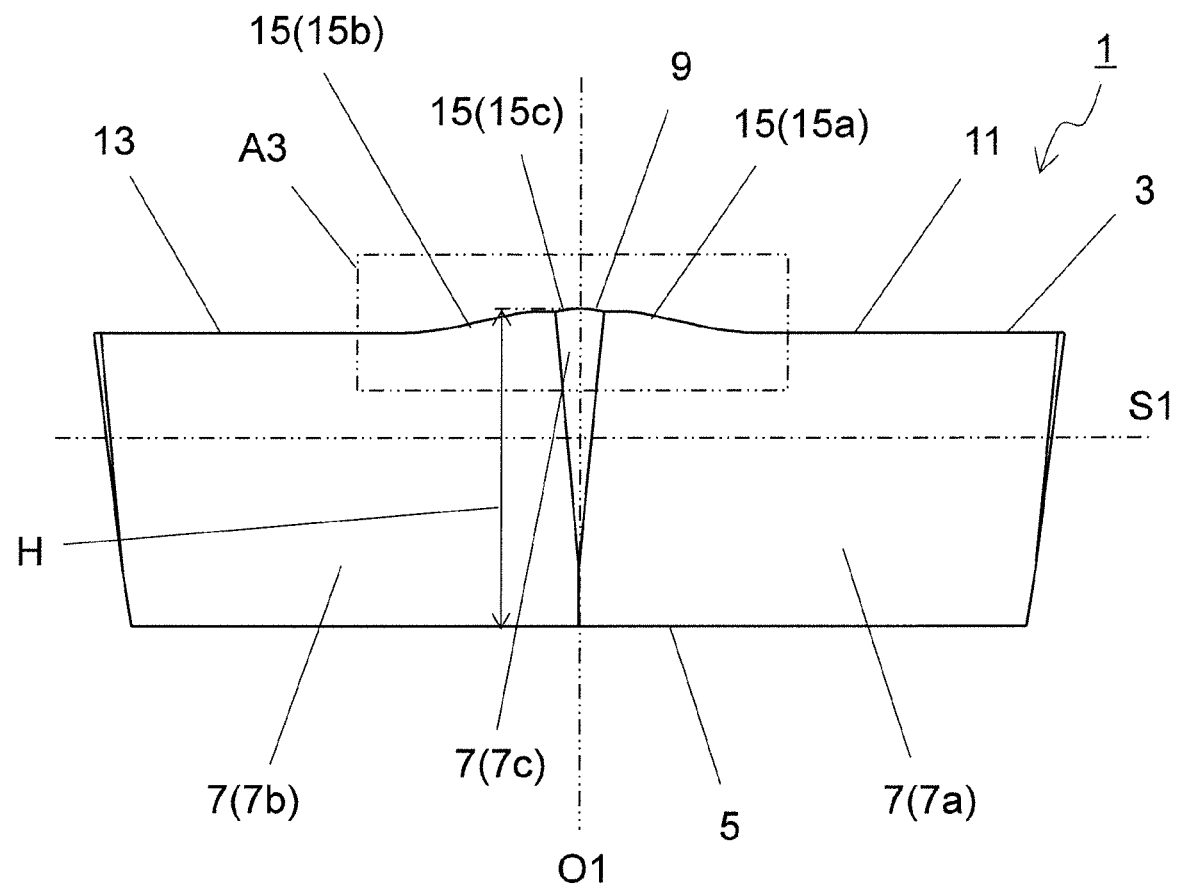
FIG. 6 is a side view of the cutting insert illustrated in FIG. 2 as viewed from a B1 direction.

In the non-limiting embodiment illustrated in FIG. 6, the first side surface 7a may be located along the first side 11 of the first surface 3. The second side surface 7b may be located along the second side 13 of the first surface 3. The corner side surface 7c may be located along the corner 9 of the first surface 3. The corner side surface 7c may be located between the first side surface 7a and the second side surface 7b, and may be adjacent to both the first side surface 7a and the second side surface 7b in the non-limiting embodiment illustrated in FIG. 6. The first side surface 7a and the second side surface 7b may have a planar shape. The corner side surface 7c may have a convex curved surface shape.

The second surface 5 may be smaller than the first surface 3 in the non-limiting embodiment illustrated in FIG. 6. In this case, the individual surface regions that form the third surface 7 (the first side surface 7a, the second side surface 7b, the corner side surface 7c or the like) may be inclined so as to approach the central axis O1 as going from a side of the first surface 3 toward a side of the second surface 5.

A cutting edge 15 may be located on at least a part of an intersection of the first surface 3 and the third surface 7. The cutting edge 15 may be located on the corner 9, a part of the first side 11 and a part of the second side 13 on a ridgeline where the first surface 3 intersects with the third surface 7 in the non-limiting embodiment illustrated in FIG. 3. Alternatively, the cutting edge 15 may be located on the whole of the first side 11 and the second side 13.

For the sake of convenience, a part of the cutting edge 15 which is located on the corner 9 may be called "a corner cutting edge 15c." A part of the cutting edge 15 which is located on the first side 11 may be called "a first cutting edge 15a." A part of the cutting edge 15 which is located on the second side 13 may be called "a second cutting edge 15b."

In cases where the cutting edge 15 is used in a cutting process, at least a part of the first surface 3 may be used as a rake surface, and at least a part of the third surface 7 may be used as a flank surface.

As illustrated in FIG. 3, the first surface 3 may include an inclined surface 17 extended from the corner 9 toward the center of the first surface 3 in the present disclosure. In cases where the corner cutting edge 15c is used in a cutting process, the inclined surface 17 may be used a rake surface.

Figure 7:
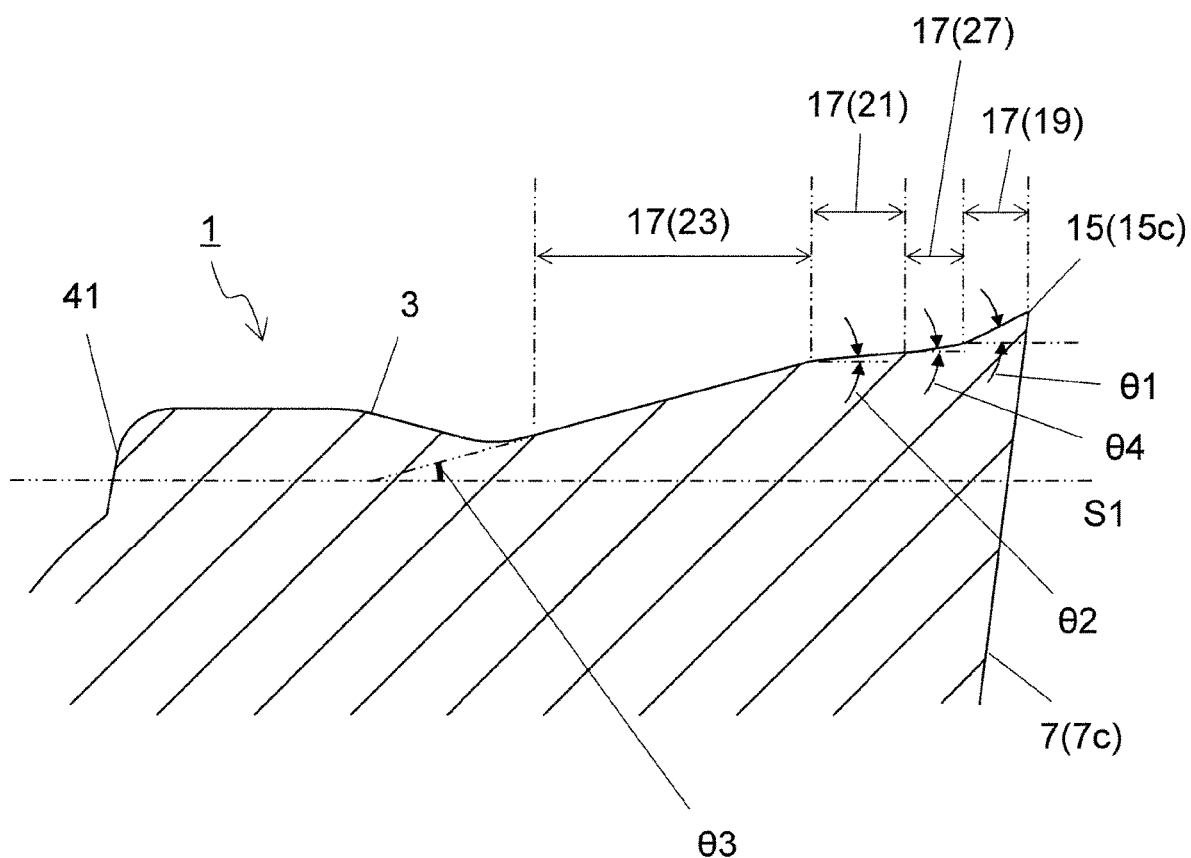
FIG. 7 is a cross-sectional view taken along the line XII-X-II in the insert illustrated in FIG. 4.

An imaginary flat surface that is orthogonal to the central axis O1 and located between the first surface 3 and the second surface 5 may be taken as a reference plane S1 as illustrated in FIG. 6. FIG. 7 may be a cross-sectional view taken along the line VII-VII in the insert 1 illustrated in FIG. 4. The cross section may be one which includes a bisector L1 of the corner 9 and is orthogonal to the reference plane S1.

Figure 8:
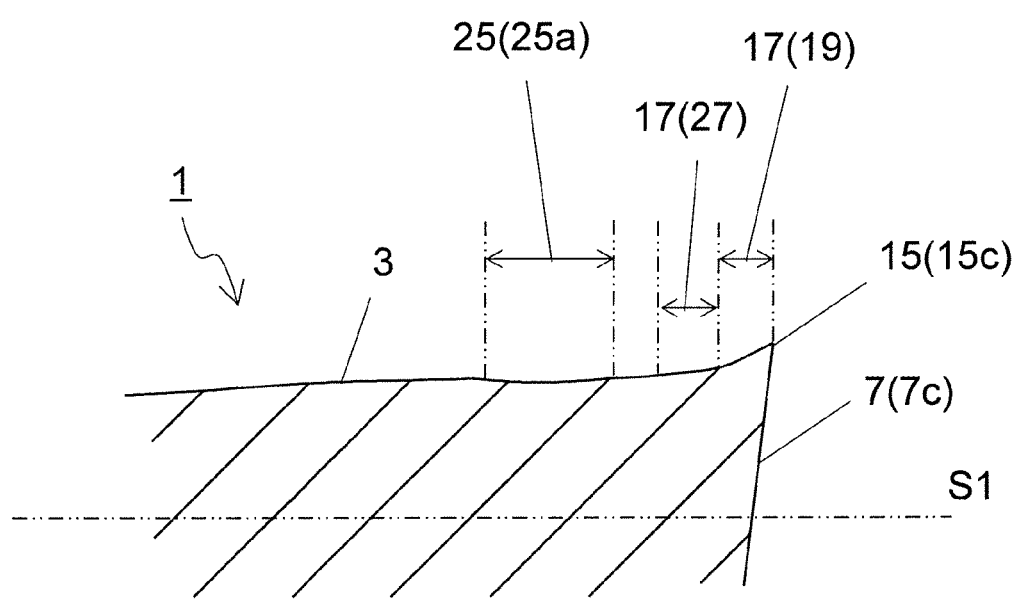
FIG. 8 is a cross-sectional view taken along the line XIII-X-III in the insert illustrated in FIG. 4.
Figure 9:
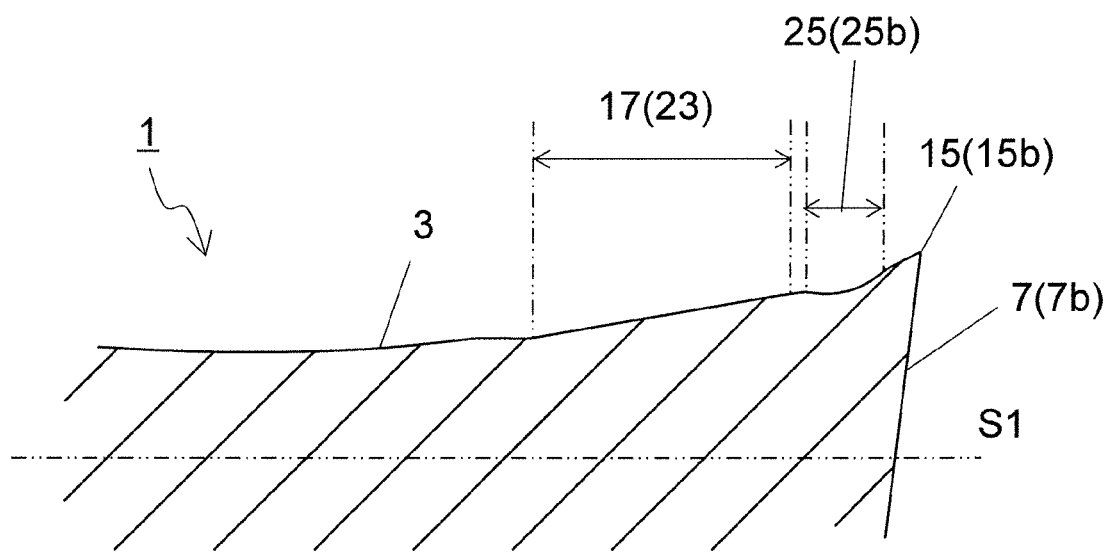
FIG. 9 is a cross-sectional view taken along the line IX-IX in the insert illustrated in FIG. 4.
Figure 10:
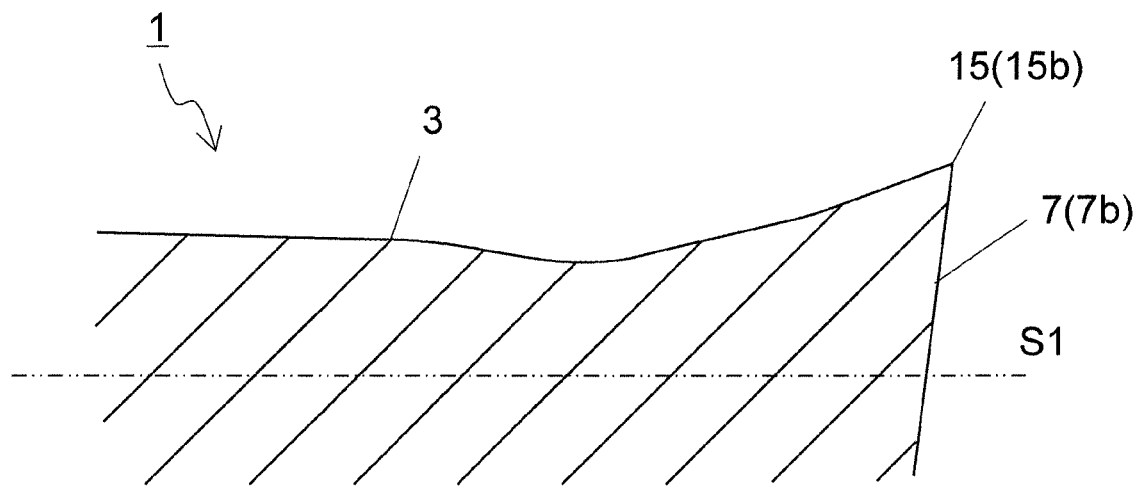
FIG. 10 is a cross-sectional view taken along the line X-X in the insert illustrated in FIG. 4.

The inclined surface 17 may be inclined so as to approach the reference plane S1 as going away from the corner 9 as illustrated in FIG. 7. FIGS. 8 to 10 may be cross-sections that are orthogonal to the reference plane S1 and orthogonal to the second cutting edge 15b in the top view.

The inclined surface 17 may include a first inclined surface 19, a second inclined surface 21 and a third inclined surface 23 in the present disclosure. Specifically, the first inclined surface 19, the second inclined surface 21 and the third inclined surface 23 may be located in order from the corner 9 toward the center of the first surface 3. In other words, the second inclined surface 21 may be located more away from the corner 9 than the first inclined surface 19, and the third inclined surface 23 may be located more away from the corner 9 than the second inclined surface 21.

The first inclined surface 19 may be inclined at a first angle θ1. The second inclined surface 21 may be inclined at a second angle θ2. The third inclined surface 23 may be inclined at a third angle θ3. The first angle θ1, the second angle θ2 and the third angle θ3 may be evaluable by an angle relative to the reference plane S1 in a cross-section that includes the bisector L1 and is orthogonal to the reference plane S1 as illustrated in FIG. 7.

Because the corner 9 has the convex curvilinear shape in an outward direction in the present disclosure, the bisector L1 may be replaced with a bisector whose corner is a point of intersection obtained by imaginary extensions of the first side 11 and the second side 13 in the top view.

Figure 11:
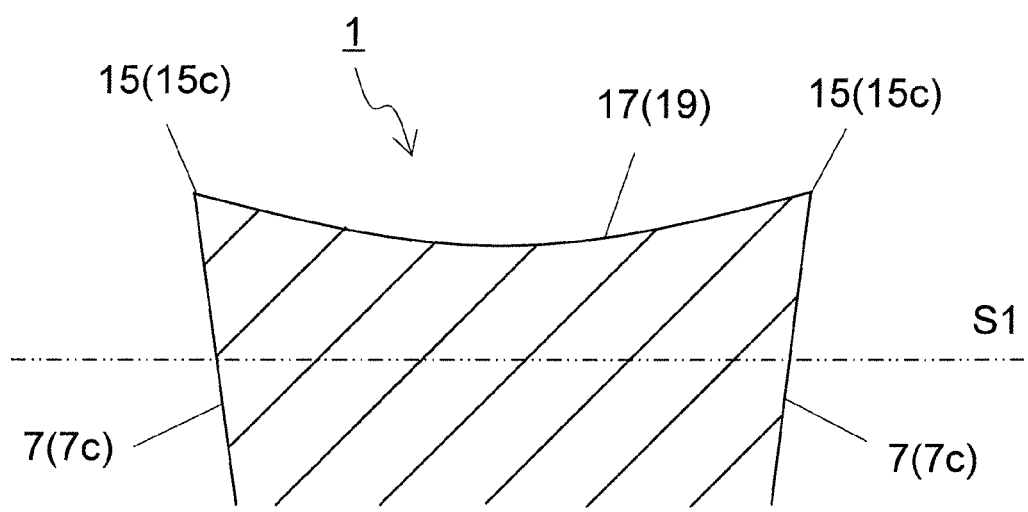
FIG. 11 is a cross-sectional view taken along the line XI-XI in the insert illustrated in FIG. 4.

The first inclined surface 19 may have a concave curved surface shape indicated by a concave curvilinear shape in a cross section orthogonal to the bisector L1 as illustrated in FIG. 11. The second inclined surface 21 may be a flat surface. FIG. 11 is a cross section that is orthogonal to the reference plane S1 and orthogonal to the bisector L1 in the top view.

In cases where the first inclined surface 19 has the concave curved surface shape as described above, chips generated during small depth machining, such as in the case of using the corner cutting edge 15c, may be likely to be curved on the first inclined surface 19. This may facilitate to stabilize a chip flow direction. In cases where the second inclined surface 21 has the above configuration, chips may tend to be curved while preventing the chips from being welded. This may make it easier for the chips to be cut out into a proper length.

As used here, the term "flat surface" need not be a strictly flat surface shape. The flat surface may have, for example, a surface shape indicated by a gentle curved line whose radius of curvature is 5 mm or more in a cross section orthogonal to the bisector L1, or alternatively a surface shape having an arithmetic surface roughness of approximately 0.5 μm.

The first angle θ1 may be settable to, for example, 20-30°. The second angle θ2 may be settable to, for example, 0-10°. The third angle θ3 may be settable to, for example, 10-20°. If the first angle θ1 is not constant, a maximum value of an inclination angle of the first inclined surface 19 may be set to the first angle θ1.

If the second angle θ2 is not constant, a maximum value of an inclination angle of the second inclined surface 21 may be a second angle θ2. If the third angle θ3 is not constant, a maximum value of an inclination angle of the third inclined surface 23 may be the third angle θ3. In a non-limiting embodiment illustrated in FIG. 7, the second angle θ2 may be smaller than either of the first angle θ1 and the third angle θ3.

The second angle θ2 may be relatively small in the non-limiting embodiment illustrated in FIG. 7, and chips may therefore be likely to be curved on the second inclined surface 21. Because the second inclined surface 21 is inclined so as to approach the reference plane S1 as going away from corner 9, chips may be less likely to welded on the second inclined surface 21. The first angle θ1 may be relatively large in the non-limiting embodiment illustrated in FIG. 7. This may lead to high cutting performance, and chips may be less likely to be welded in the vicinity of the cutting edge 15.

The third angle θ3 may be relatively large in the non-limiting embodiment illustrated in FIG. 7. Hence, chip clogging may be less likely to occur during high feed machining, such as in cases where chips jump over the second inclined surface 21 without coming into contact with the second inclined surface 21. In high depth machining, such as in the case of using the corner 9 and the first side 11 as the cutting edge 15, chip clogging may be less likely to occur. Consequently, the insert 1 of the present disclosure may achieve stable chip control.

The third angle θ3 may be larger than the first angle θ1. Alternatively, the first angle θ1 may be larger than the third angle θ3 as in the non-limiting embodiment illustrated in FIG. 7. If the first angle θ1 is larger than the third angle θ3, cutting performance for a workpiece may be further enhanced, and chips may be much less likely to be welded in the vicinity of the cutting edge 15. If the third angle θ3 is smaller than the first angle θ1, chips may be likely to be curved on the third inclined surface 23.

Dimensions of the insert 1 are not limited to specific values. A maximum width W of the first surface 3 may be set to, for example, approximately 6-25 mm. A height H from the first surface 3 to the second surface 5 may be set to approximately 1-10 mm. As used here, the term "height from the first surface 3 to the second surface 5" may denote a length in a direction parallel to the central axis O1 in between an upper end of the first surface 3 and a lower end of the second surface 55.

For example, cemented carbide or cermet may be usable as a material of the insert 1. Examples of composition of the cemented carbide may include WC—Co, WC—TiC—Co and WC—TiC—TaC—Co in which WC, Ti, C and TaC are hard particles and Co is a binding phase.

The cermet may be a sintered composite material obtainable by compositing metal into a ceramic component. Examples of the cermet may include titanium compounds composed mainly of titanium carbide (TiC) or titanium nitride (TiN). Needless to say, the material of the insert 1 is not limited to the above composition.

A surface of the insert 1 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

A shape of the third inclined surface 23 is not particularly limited. For example, the third inclined surface 23 may have a concave curved surface shape indicated by a concave curvilinear shape in the cross section that includes the bisector L1 and is orthogonal to the reference plane S1. Alternatively, the third inclined surface 23 may be a flat surface as illustrated in FIG. 3. If the third inclined surface 23 is the flat surface, chips may tend to be curved on the third inclined surface 23 upon contact with the third inclined surface.

A length L32 of the third inclined surface 23 in a direction orthogonal to the bisector L1 may be larger than a length L22 of the second inclined surface 21 in the direction orthogonal to the bisector L1 in the top view. If the length L32 of the third inclined surface 23 located more away from the corner 9 than the second inclined surface 21 is larger than the length L22 of the second inclined surface 21, chips may tend to be stably controlled on the third inclined surface 23 even if a flow direction of chips generated at the corner 9 is varied.

Alternatively, the length L21 of the second inclined surface 21 in a direction along the bisector L1 may be larger than the length L11 of the first inclined surface 19 in the direction along the bisector L1 in the top view. If the length L21 of the second inclined surface 21 is larger than the length L11 of the first inclined surface 19, the chips may tend to be stably controlled on the second inclined surface 21. If the length L11 of the first inclined surface 19 is smaller than the length L21 of the second inclined surface 21, the corner cutting edge 15c may have enhanced durability.

Still alternatively, a length L31 of the third inclined surface 23 in the direction along the bisector L1 may be larger than the length L21 of the second inclined surface 21 in the direction along the bisector L1 in the top view. If the length L31 of the third inclined surface 23 used mainly for controlling chips during high depth machining is larger than the length L21 of the second inclined surface 21 used mainly for controlling chips during low depth machining, the chips can be controlled more suitably during the high depth machining. A specific reason for this may be as follows.

A width of a chip may become larger and the chip may tend to be extended on a side opposite to a feed direction of a cutting tool during the high depth machining. However, if the length L31 of the third inclined surface 23 is larger than the length L21 of the second inclined surface 21, a large space for curving the chip may be ensured on the third inclined surface 23. This may lead to good chip control during the high depth machining. If the length L21 of the second inclined surface 21 is smaller than the length L31 of the third inclined surface 23, the chip may be less likely to come into strong contact with the second inclined surface 21. This may lead to good chip control on the third inclined surface 23.

The first surface 3 may further include a pair of recess parts 25 located by interposing therebetween the second inclined surface 21 in the direction orthogonal to the bisector L1 as in the non-limiting embodiment illustrated in FIG. 2. If the first surface 3 includes the recess parts 25, the stable chip control may be attainable during both the low depth machining and the high depth machining.

Chips may tend to stably come into contact with the second inclined surface 21 because the recessed parts 25 do not inhibit the chip flow during the low depth machining, such as in the case of using the corner cutting edge 15c. This may lead to the stable chip control during the low depth machining. Additionally, a large space to permit passage of chips generated by the first side 11 may be ensured during the high depth machining, such as in the case of using the corner 9 and the first side 11 as the cutting edge 15. Hence, the chips generated by the first side 11 may be less prone to clogging, thus leading to the stable chip control even during the high depth machining.

Although a shape of the recess parts 25 is not particularly limited, the recess parts 25 may have a concave curved surface shape. The recess parts 25 having the concave curved surface shape may be indicated by a concave curvilinear shape in the cross section orthogonal to the bisector L1. Alternatively, the recess parts 25 may be indicated by a concave curvilinear shape in a cross section that is orthogonal to the reference plane S1 and parallel to the bisector L1. If the recess parts 25 have the concave curved surface shape, chip clogging may be much less likely to occur on the recess parts 25 even if the chips come into contact with surfaces of the recess parts 25. This may lead to enhanced chip discharge performance.

In cases where the first surface 3 includes the pair of recess parts 25, a length L41 of the pair of recess parts 25 in a direction along the bisector L1 may be larger than a length L21 of the second inclined surface 21 in the direction along the bisector L1 in a plan view of the first surface 3. If the recess parts 25 have the above configuration, it may be easier for chips to stably come into contact with the second inclined surface 21 in a wide range of the second inclined surface 21.

Of the pair of recess parts 25, the recess part 25a located on a side of the first side 11 may be configured so that a length L42 in a direction along the first side 11 is larger than a length L43 in a direction orthogonal to the first side 11 in the top view. Of the pair of recess parts 25, the recess part 25b located on a side of the second side 13 may be configured so that a length L44 in a direction along the second side 13 is larger than a length L45 in a direction orthogonal to the second side 13 in the top view.

If the pair of recess parts 25 have the above configuration, a wide space to permit passage of chips generated by the first side 11 or the second side 13 may be kept even in a cutting process at a higher depth of cut, while ensuring the length L22 of the second inclined surface 21 in the direction orthogonal to the bisector L1.

Figure 5:
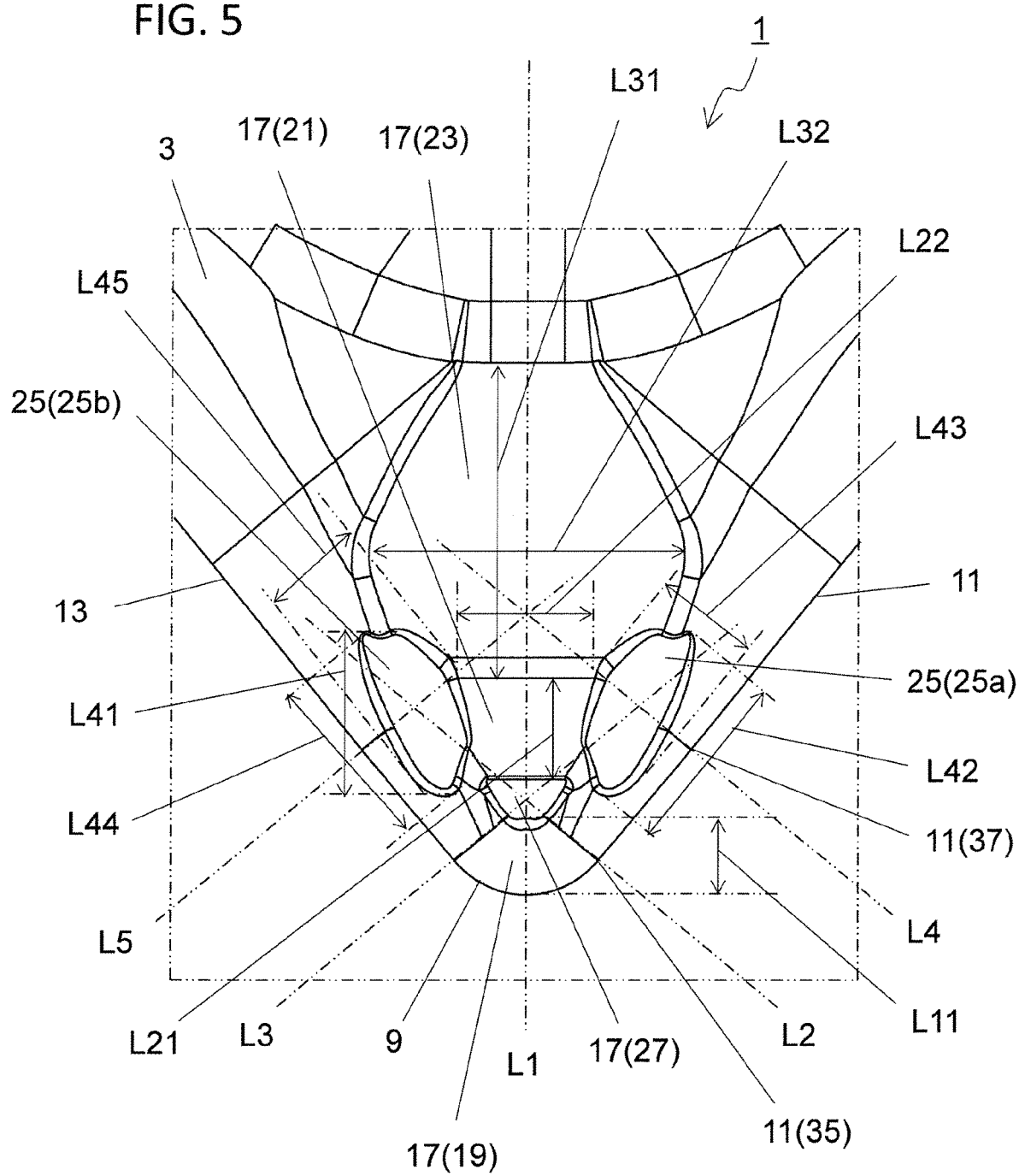
FIG. 5 is an enlarged view illustrating the same region as in FIG. 4.

In the non-limiting embodiment illustrated in FIG. 5, the recess part 25a of the pair of recess parts 25, which is located on the side of the first side 11, may be located on a second imaginary straight line L3 that passes through a boundary between the corner 9 and the second side 13 and is orthogonal to the second side 13 in the top view. If the recess part 25a is located as described above, enhanced chip discharge performance may be attainable for the following reason.

Because a flow direction of chips generated by the corner 9 is different from a flow direction of chips generated by the second side 13, a flow direction of chips generated at a boundary between the corner 9 and the second side 13 may tend to become unstable. However, because the recess part 25a is located in a direction in which chips whose flow direction tends to become unstable are likely to flow, chip clogging may be less likely to occur. This may lead to enhanced chip discharge performance.

In the non-limiting embodiment illustrated in FIG. 5, the recess part 25b of the pair of recess parts 25, which is located on the side of the second side 13, may be located on a first imaginary straight line L2 that passes through a boundary between the corner 9 and the first side 11 and is orthogonal to the first side 11 in the top view. If the recess part 25b is located as described above, enhanced chip discharge performance may be attainable during the time when the corner 9 and the first side 11 are used as the cutting edge 15.

The inclined surface 17 may further include a fourth inclined surface 27 which is flat, located between the first inclined surface 19 and the second inclined surface 21 and inclined at a fourth angle θ4. In the case of including the fourth inclined surface, the fourth angle θ4 may be smaller than the first angle θ1 and larger than the second angle θ2 in a cross section that includes the bisector L1 and is orthogonal to the reference plane S1, as in the non-limiting embodiment illustrated in FIG. 7.

In the case of including the fourth inclined surface 27 having the above configuration, a chip flow direction along the first inclined surface 19 changes stepwise through the fourth inclined surface 27. Chips may therefore be likely to smoothly flow to the second inclined surface 21, and chip clogging may be less likely to occur on the second inclined surface 21.

As described above, the pair of recess parts 25 may be located with the second inclined surface 21 interposed therebetween in the direction orthogonal to the bisector L1. Alternatively, the pair of recess parts 25 may be located by interposing therebetween the fourth inclined surface 27 in addition to the second inclined surface 21 in the direction orthogonal to the bisector L1. Still alternatively, the pair of recess parts 25 may be located by interposing therebetween the fourth inclined surface 27 instead of the second inclined surface 21 in the direction orthogonal to the bisector L1.

The first surface 3 may include a surface that is extended along the first side 11 and inclined so as to approach the reference plane S1 as going away from the first side 11 in the non-limiting embodiment illustrated in FIG. 3. This surface may be usable as a rake surface if using the first cutting edge 15a. The first surface 3 may also include a surface that is extended along the second side 13 and inclined so as to approach the reference plane S1 as going away from the second side 13 in the non-limiting embodiment illustrated in FIG. 3. This surface may be usable as a rake surface if using the second cutting edge 15b.

Figure 4:
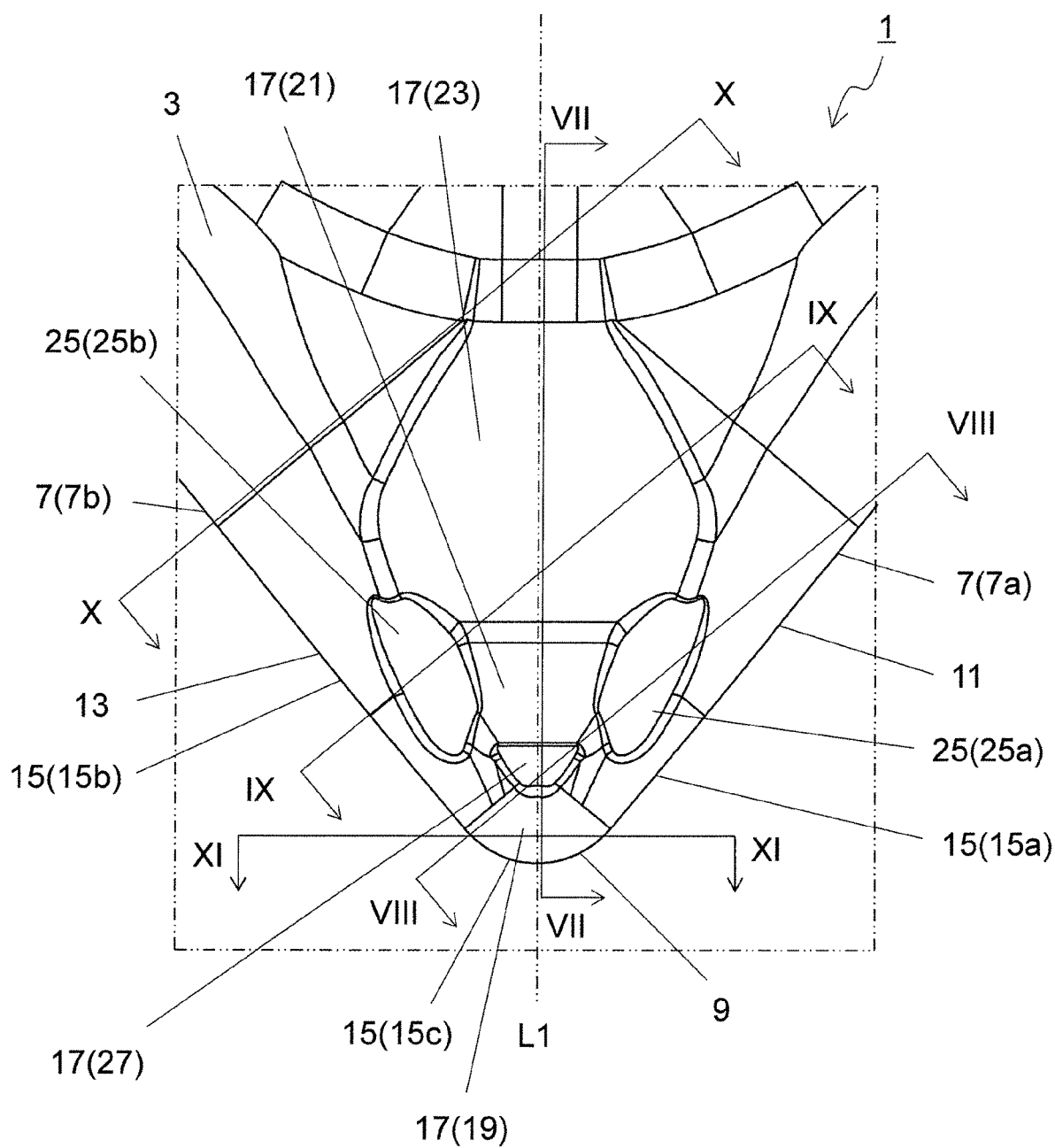
FIG. 4 is an enlarged view of a region A2 illustrated in FIG. 2.

The first surface 3 may have such a shape as to become line symmetry on the basis of the bisector L1 in the non-limiting embodiment illustrated in FIG. 4. In cases where the first surface 3 has a line symmetric shape as illustrated in FIG. 4, equivalent cutting performance may be attainable both if the corner 9 and the first side 11 may be used as the cutting edge 15 and if the corner 9 and the second side 13 are used as the cutting edge 15.

The corners 9 in the present disclosure may have a convex curvilinear shape in an outward direction in the top view. A height of each of the corners 9 from the reference plane S1 may be kept constant or changed in a side view.

Figure 12:
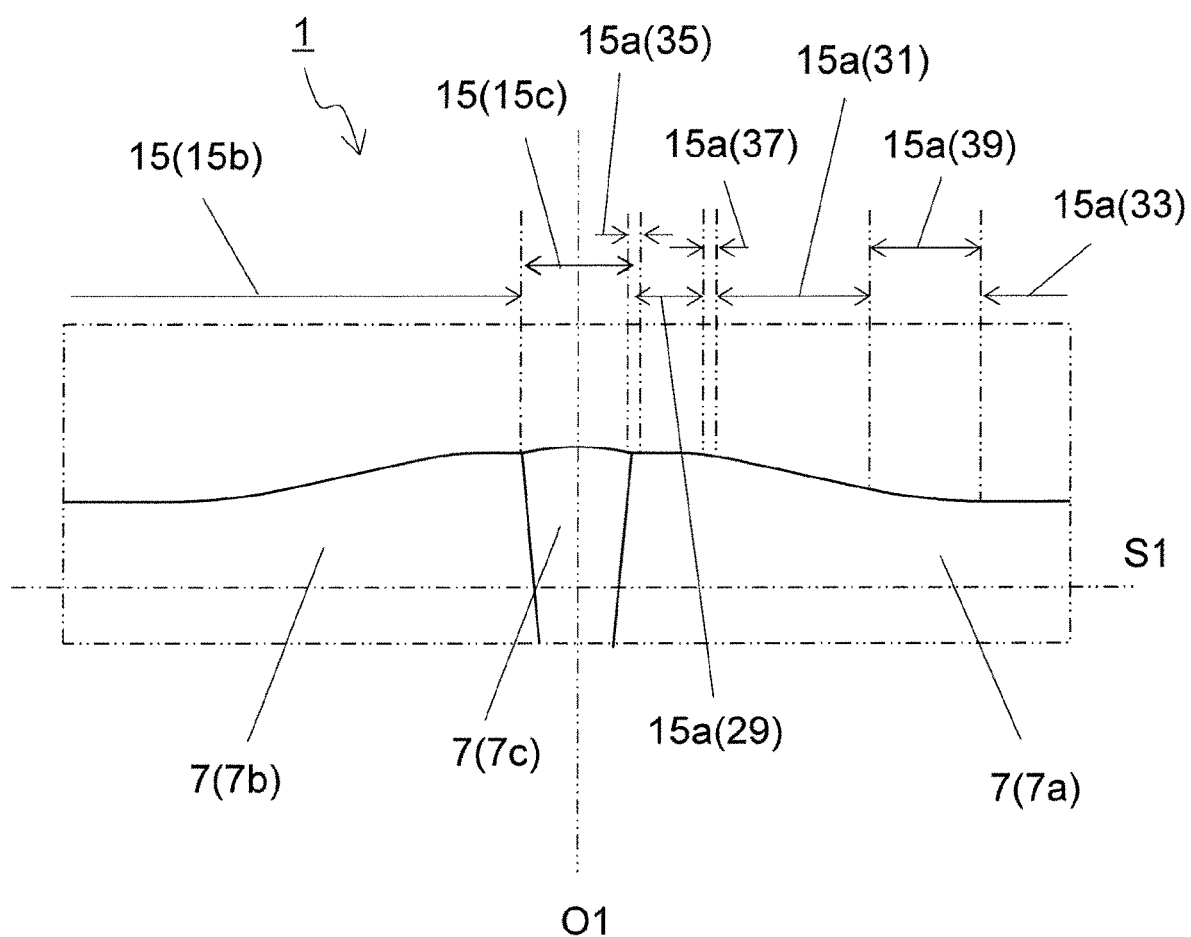
FIG. 12 is an enlarged view of a region A3 illustrated in FIG. 6.
Figure 13:
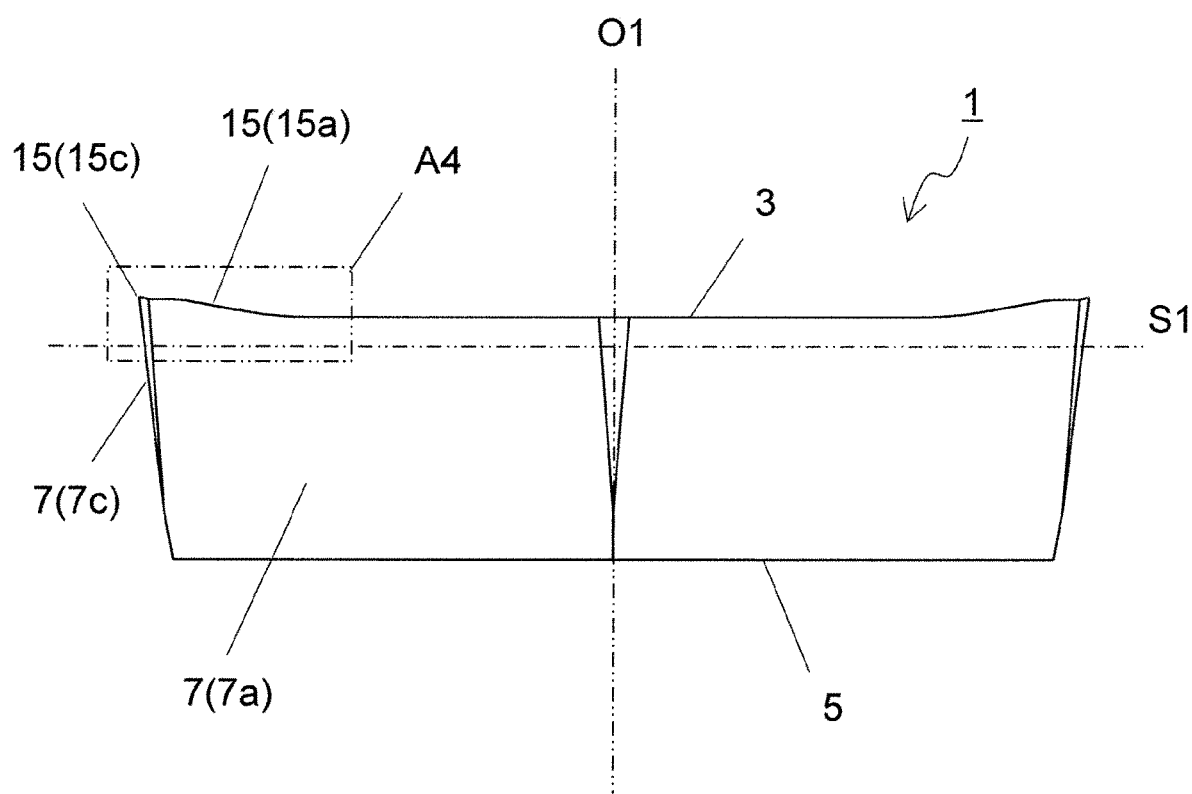
FIG. 13 is a side view of the cutting insert illustrated in FIG. 2 as viewed from a B2 direction.

The corners 9 may be configured so that a height of a center intersecting with the bisector L1 is largest and decreased as going from the center toward the first side 11 and the second side 13 in a non-limiting embodiment illustrated in FIG. 12. In other words, the corner cutting edge 15c located at each of the corners 9 may have a larger height from the reference plane S1 as going away from the first side 11 and the second side 13. If the corners 9 have the above configuration, it may become easier for the insert 1 to bite into a workpiece during a cutting process. FIG. 12 may be an enlarged view of the insert 1 as viewed from the direction along the bisector L1.

Figure 14:
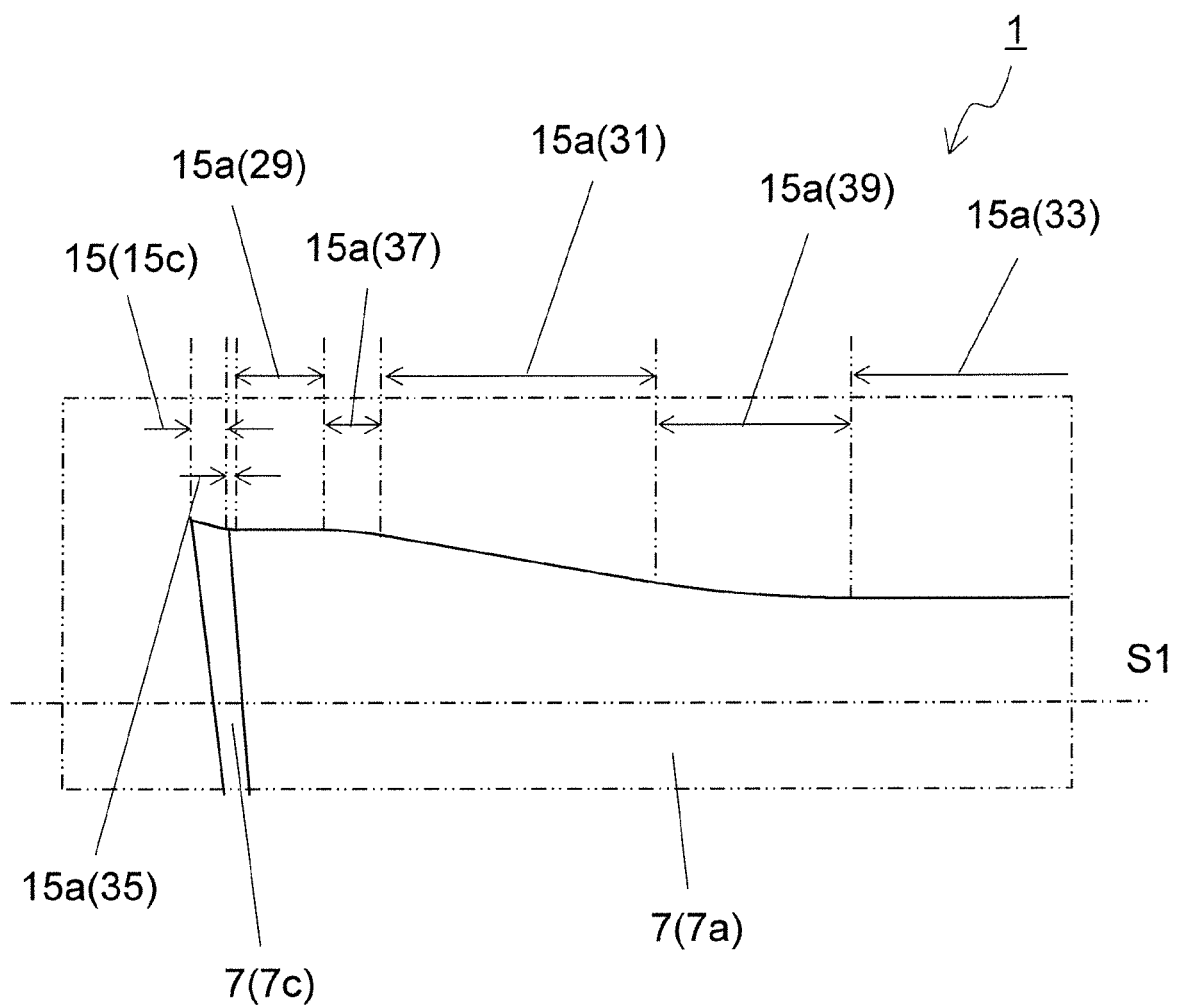
FIG. 14 is an enlarged view of a region A4 illustrated in FIG. 13.

The first side 11 may have an approximately straight line shape in the top view in the present disclosure. A height of the first side 11 from the reference plane S1 may be kept constant or changed in the side view. The first side 11 may include a first portion 29, a second portion 31 and a third portion 33, each having a straight line shape as in a non-limiting embodiment illustrated in FIG. 14. FIG. 14 may be an enlarged view of the insert 1 as viewed from a direction that is parallel to the reference plane S1 and orthogonal to the bisector L1.

The first portion 29 may be adjacent to the corner 9 and inclined relative to the corner 9. In this case, an inclination angle of the first portion 29 relative to the reference plane S1 may be smaller than an inclination angle of the corner 9 relative to the reference plane S1.

The second portion 31 may be adjacent to the first portion 29 and inclined relative to the first portion 29. In this case, an inclination angle of the second portion 31 relative to the reference plane S1 may be larger than the inclination angle of the first portion 29 relative to the reference plane S1. The third portion 33 may be adjacent to the second portion 31 and inclined relative to the second portion 31. In this case, an inclination angle of the third portion 33 relative to the reference plane S1 may be smaller than the inclination angle of the second portion 31 relative to the reference plane S1.

The first side 11 may further include, in addition to the first portion 29, the second portion 31 and the third portion 33, a first connection portion 35 for connecting the corner 9 and the first portion 29, a second connection portion 37 for connecting the first portion 29 and the second portion 31, and a third connection portion 39 for connecting the second portion 31 and the third portion 33.

The first connection portion 35 may have a curvilinear shape that is protruded toward the reference plane S1 as in the non-limiting embodiment illustrated in FIG. 14. The second connection portion 37 may have a curvilinear shape that is protruded in a direction away from the reference plane S1 as in the non-limiting embodiment illustrated in FIG. 14. The third connection portion 39 may have a curvilinear shape that is protruded toward the reference plane S1 as in the non-limiting embodiment illustrated in FIG. 14.

The second side 13 may have a line symmetric shape relative to the first side 11 on the basis of the central axis O1 in the non-limiting embodiment illustrated in FIG. 12. The second side 13 may include portions respectively corresponding to the first portion 29, the second portion 31, the third portion 33, the first connection portion 35, the second connection portion 37 and the third connection portion 39 on the first side 11, as in the non-limiting embodiment illustrated in FIG. 12.

In the non-limiting embodiment illustrated in FIG. 5, the first imaginary straight line L2 may intersect with the second imaginary straight line L3 on the fourth inclined surface 27 in the top view. If the fourth inclined surface 27 is located as described above, chips may be stably dischargeable for the following reason both if the corner 9 and the first side 11 are used as the cutting edge 15 and if the corner 9 and the second side 13 are used as the cutting edge 15.

If the fourth angle θ4 of the fourth inclined surface 27 is smaller than the first angle θ1 and larger than the second angle θ2, a surface region formed by the first inclined surface 19, the fourth inclined surface 27 and the second inclined surface 21 may have a concave shape. If the first connection portion 35 and a part of the second side 13 which corresponds to the first connection portion 35 have a curvilinear shape that is protruded toward the reference plane S1, chips generated at the above portions may tend to be curved in a concave shape.

If the first imaginary straight line L2 intersects with the second imaginary straight line L3 on the fourth inclined surface 27 as described above, the chips curved in the concave shape may tend to flow in the concave shaped surface region both if the corner 9 and the first side 11 are used as the cutting edge 15 and if the corner 9 and the second side 13 are used as the cutting edge 15. This may result in a state where the chips curved in the concave shape are wrapped up in the concave-shaped surface region. Consequently, because the chip flow direction becomes stable, chip clogging may be less likely to occur and chips can be discharged suitably.

As in the non-limiting embodiment illustrated in FIG. 5, a straight line orthogonal to the second connection portion 37 may be taken as a third imaginary straight line L4, and a straight line orthogonal to a part of the second side 13 which corresponds to the second connection portion 37 may be taken as a fourth imaginary straight line L5 in the top view. Of the pair of recess parts 25, the recess part 25b located on the side of the second side 13 may be located on a side of the corner 9 on the basis of the third imaginary straight line L4. If the recess part 25a is located as described above, enhanced chip discharge performance may be attainable for the following reason.

A chip width may become larger if the second portion 31 is used as the cutting edge 15 than if only the corner 9 is used as the cutting edge 15. If the recess part 25b is located on the side of the corner 9 on the basis of the third imaginary straight line L4, the chips having a large width may tend to come into contact with the recess part 25b. Consequently, the chips having the large width may tend to be curled at the recess part 25b, and chip clogging may be therefore less likely to occur, thus leading to the enhanced chip discharge performance.

Of the pair of recess parts 25, the recess part 25a located on the side of the first side 11 may be located on a side of the corner 9 on the basis of the fourth imaginary straight line L5 in the top view as in the non-limiting embodiment illustrated in FIG. 5. If the recess part 25b is located as described above, enhanced chip discharge performance may be attainable for the following reason.

A chip width may become larger if a portion corresponding to the second portion 31 is used as the cutting edge 15 than if only the corner 9 is used as the cutting edge 15. If the recess part 25a is located on the side of the corner 9 on the basis of the fourth imaginary straight line L5, the chips having a large width may tend to come into contact with the recess part 25a. The chips having the large width may tend to be curled at the recess part 25a, and chip clogging may be therefore less likely to occur, thus leading to the enhanced chip discharge performance.

The insert 1 may include a through hole 41 that opens into the first surface 3 and the second surface 5 in a non-limiting embodiment. The through hole 41 may be formed from a midportion of the first surface 3 toward a midportion of the second surface 5. The through hole 41 may be usable for fixing the insert 1 to a holder of the cutting tool. The insert 1 may be fixable to the holder, for example, by inserting a screw into the through hole 41 and by screwing the insert 1.

An extension direction of the through hole 41, namely, a penetration direction may be orthogonal to the first surface 3 and the second surface 5 in the non-limiting embodiment.

Because the through hole 41 is formed from the midportion of the first surface 3 toward the midportion of the second surface 5, a center of the through hole 41 may coincide with the central axis O1 in FIG. 1.

<Cutting Tools>

The cutting tool 101 in a non-limiting embodiment may be described below with reference to the drawings.

Figure 15:
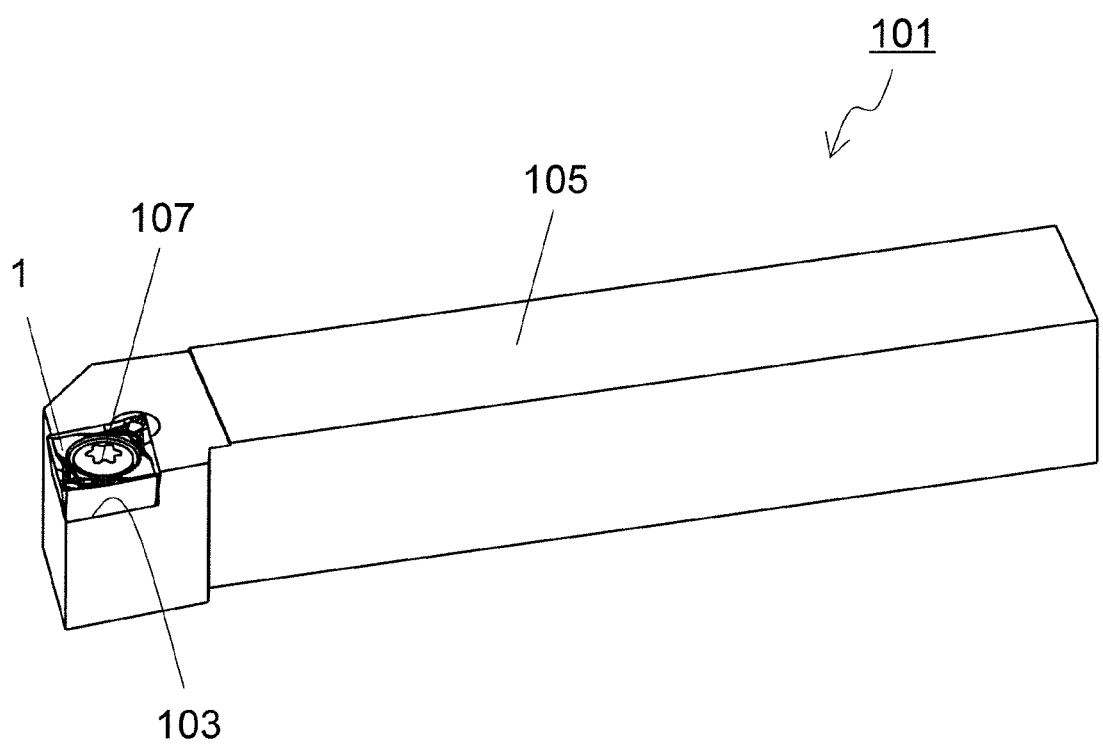
FIG. 15 is a perspective view illustrating a cutting tool in a non-limiting embodiment.

The cutting tool 101 in the non-limiting embodiment illustrated in FIG. 15 may include a holder 105 including a pocket 103 on a side of a front end thereof, and the insert located in the pocket 103. The insert may be attached so that at least a part thereof used as the cutting edge is protruded from the front end of the holder 105 in the cutting tool 101 in the present disclosure.

The holder 105 may have a long narrow bar shape. The single pocket 103 may be disposed on a side of the front end of the holder 105. The pocket 103 may be a part that permits attachment of the insert and opens into a front end surface of the holder 105. Alternatively, the pocket 103 may also open into a side surface of the holder 105. This may facilitate the attachment of the insert. Specifically, the pocket 103 may include a seating surface parallel to a lower surface of the holder 105, and a constraining side surface inclined relative to the seating surface.

The insert may be located in the pocket 103. The second surface of the insert may be in direct contact with the pocket 103. Alternatively, a sheet may be disposed between the insert and the pocket 103.

The insert may be attached so that parts used as the cutting edge are protruded outward from the holder 105. The insert may be attached to the holder 105 by a fixing screw 107 in the present disclosure. Specifically, the insert may be attached to the holder 105 by inserting the fixing screw 107 into a screw hole of the insert and by inserting a front end of the fixing screw 107 into a screw hole formed in the inset pocket 103 so as to establish thread engagement between screw parts.

For example, steel or cast iron may be usable for the holder 105. Of these materials, steel having enhanced toughness may be particularly preferable.

The present disclosure may have illustrated and described the cutting tools for use in the so-called turning process. Examples of the turning process may include internal machining, external machining and grooving process. The cutting tools are not limited to ones which are used for the turning process. For example, the inserts in the above non-limiting embodiments may be used for a cutting tool for use in a milling process.

<Method for Manufacturing Machined Product>

A method for manufacturing a machined product in non-limiting embodiments may be described below with reference to the drawings.

The machined product 203 may be manufacturable by carrying out a cutting process of a workpiece 201. The method for manufacturing the machined product 203 in the present disclosure may include the following steps:

(1) rotating the workpiece 201;

(2) bringing the cutting tool 101 represented by the above non-limiting embodiment into contact with the workpiece 201 being rotated; and (3) moving the cutting tool 101 away from the workpiece 201.

Figure 16:
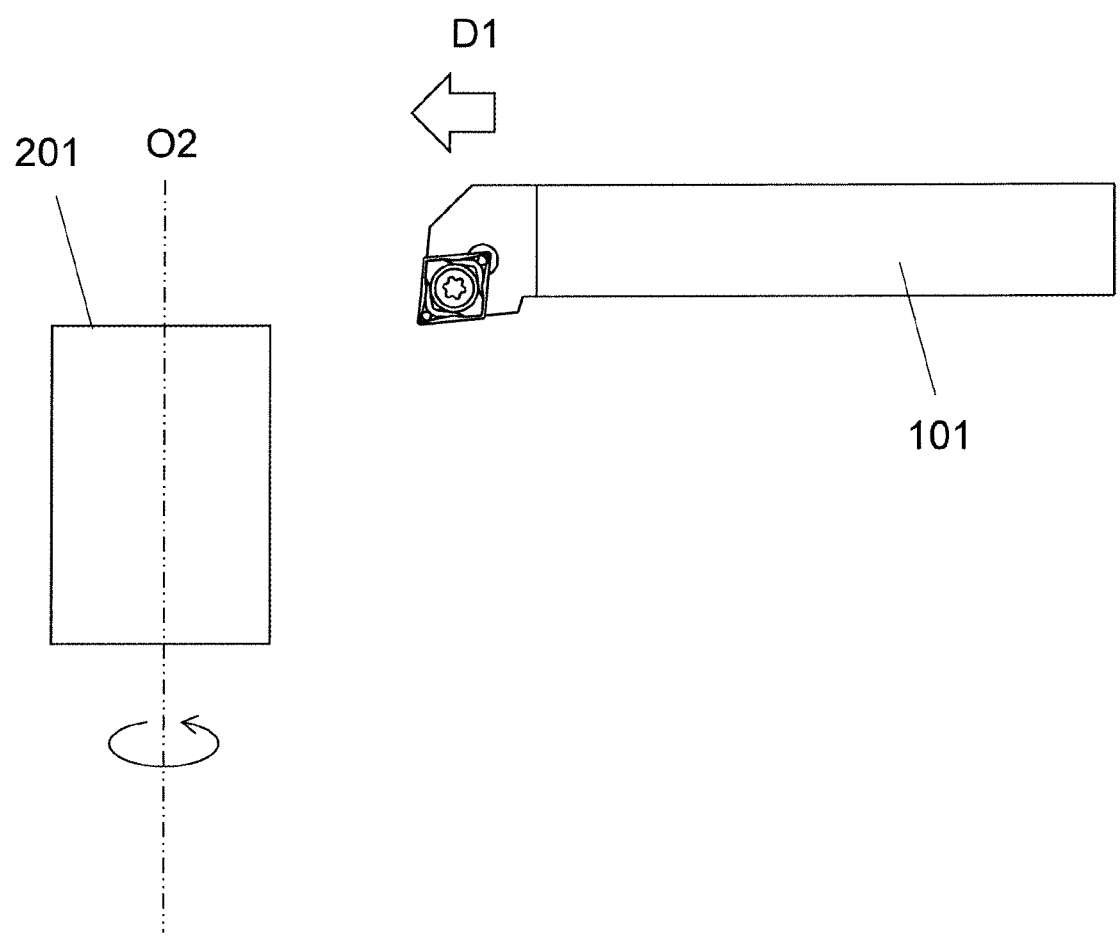
FIG. 16 is a schematic diagram illustrating one of steps in a method for manufacturing a machined product in a non-limiting embodiment.
Figure 17:
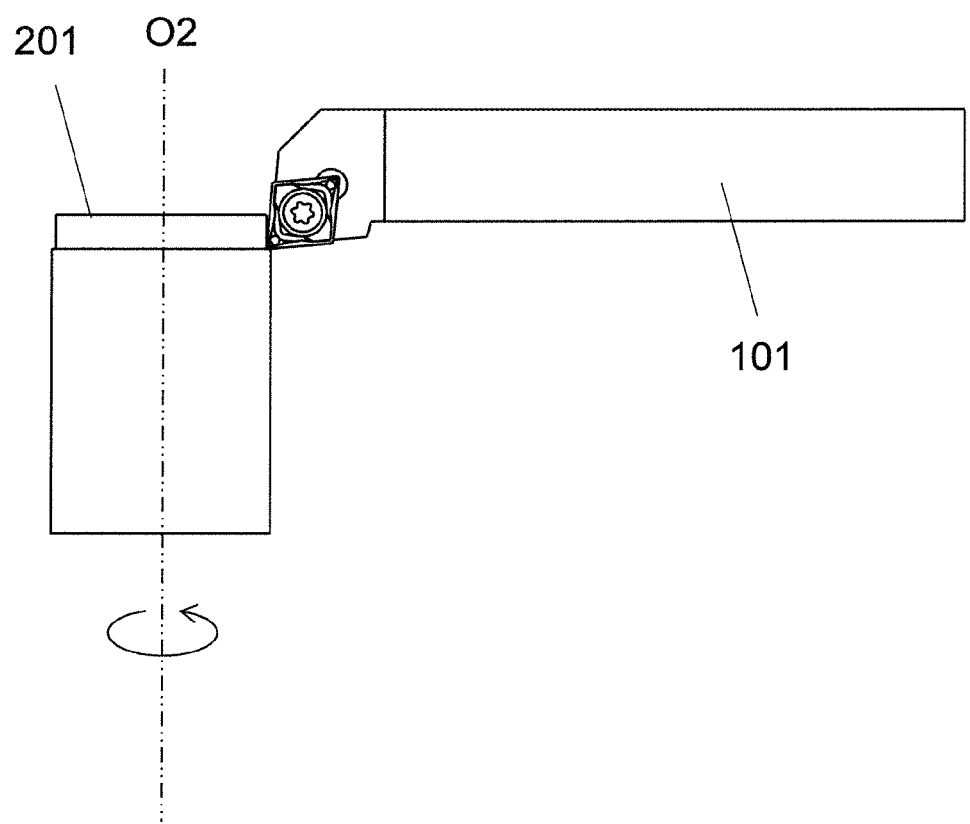
FIG. 17 is a schematic diagram illustrating one of the steps in the method for manufacturing a machined product in the non-limiting embodiment.
Figure 18:
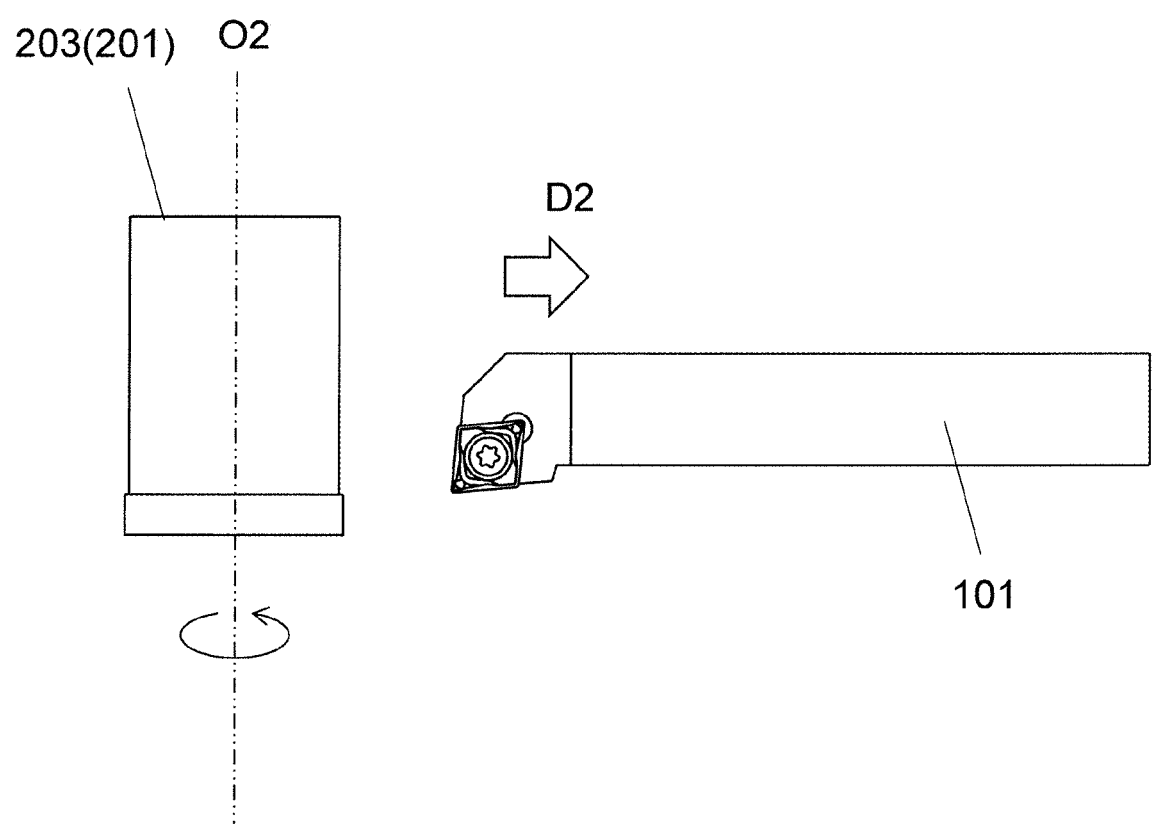
FIG. 18 is a schematic diagram illustrating one of the steps in the method for manufacturing a machined product in the non-limiting embodiment.

More specifically, the workpiece 201 may be firstly rotated around an axis O2, and the cutting tool 101 may be relatively brought near the workpiece 201 as illustrated in FIG. 16. The workpiece 201 may be then cut out by bringing the cutting edge in the cutting tool 101 into contact with the workpiece 201 as illustrated in FIG. 17. Thereafter, the cutting tool 101 may be relatively moved away from the workpiece 201 as illustrated in FIG. 18.

In the present disclosure, the cutting tool 101 may be brought near the workpiece 201 by moving the cutting tool 101 in a D1 direction in a state where the axis O2 is fixed and the workpiece 201 is rotated around the axis O2. In FIG. 17, the workpiece 201 may be cut out by bringing the cutting edge in the insert into contact with the workpiece 201 being rotated. In FIG. 18, the cutting tool 101 may be moved away by moving the cutting tool 101 in a D2 direction in a state where the workpiece 201 is rotated.

During the cutting process with the manufacturing method in the present disclosure, the cutting tool 101 may be brought into contact with the workpiece 201, or the cutting tool 101 may be moved away from the workpiece 201 by moving the cutting tool 101 in each of the above steps. However, it is not intended to limit to this non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert into contact with different portions of the workpiece 201 may be repeated while keeping the workpiece 201 rotated.

Representative examples of material of the workpiece 201 may include carbon steel, alloy steel, stainless steel, cast iron and nonferrous metals.

DESCRIPTION OF THE REFERENCE NUMERAL 1 insert
3 first surface
5 second surface
7 third surface
9 corner
11 first side
13 second side
15 cutting edge
17 inclined surface
19 first inclined surface 21 second inclined surface
23 third inclined surface
25 recess part
27 fourth inclined surface
29 first portion
31 second portion
33 third portion
35 first connection portion
37 second connection portion
39 third connection portion
41 through hole
101 cutting tool
103 pocket
105 holder
107 screw
201 workpiece
203 machined product
O1 central axis
S1 reference plane
L1 bisector
L2 first imaginary straight line
L3 second imaginary straight line
θ1 first angle
θ2 second angle
θ3 third angle
θ4 fourth angle

The invention claimed is:

1. A cutting insert, comprising:
a first surface comprising a corner having a convex curvilinear shape in an outward direction, and a first side and a second side each being extended from the corner;
a second surface located on a side opposite to the first surface; and
a third surface located between the first surface and the second surface, wherein
an imaginary line passing through a center of the first surface and a center of the second surface is a central axis,
an imaginary plane, which is orthogonal to the central axis and is located between the first surface and the second surface, is a reference plane,
the first surface further comprises an inclined surface that approaches the reference plane as going away from the corner,
the inclined surface comprises
a first inclined surface inclined at a first angle,
a second inclined surface located farther from the corner than the first inclined surfaced and inclined at a second angle, and
a third inclined surface located farther from the corner than the second inclined surface and inclined at a third angle,
the first inclined surface has a concave curvilinear shape in a cross section orthogonal to a bisector of the corner,
the second inclined surface is a flat surface,
the second angle is smaller than either of the first angle and the third angle in a cross section that includes the bisector and is orthogonal to the reference plane, and
a width of the second inclined surface in a direction along the bisector is larger than a width of the first inclined surface in the direction along the bisector in a plan view of the first surface.

2. The cutting insert according to claim 1, wherein a width of the third inclined surface in a direction along the bisector is larger than a width of the second inclined surface in the direction along the bisector in a plan view of the first surface.

3. The cutting insert according to claim 1, wherein the first surface further comprises a pair of recess parts by interposing therebetween the second inclined surface in a direction orthogonal to the bisector in a plan view of the first surface.

4. The cutting insert according to claim 3, wherein a length width of the pair of recess parts in the direction along the bisector is larger than a length width of the second inclined surface in the direction along the bisector in the plan view.

5. The cutting insert according to claim 3, wherein
the pair of recess parts comprises
a first recess part, and
a second recess part closer to the second side than the first recess part,
an imaginary straight line, which passes through a boundary between the corner and the first side and is orthogonal to the first side in the plan view, is a first imaginary straight line, and
the second recess part is located on the first imaginary straight line in the plan view.

6. The cutting insert according to claim 1, wherein
the inclined surface further comprises a fourth inclined surface which is located between the first inclined surface and the second inclined surface and is inclined at a fourth angle,
the fourth angle is smaller than the first angle and larger than the second angle in the cross section which includes the bisector and is orthogonal to the reference plane.

7. The cutting insert according to claim 6, wherein
an imaginary straight line, which passes through the boundary between the corner and the first side and is orthogonal to the first side in a plan view of the first surface, is a first imaginary straight line,
an imaginary straight line, which passes through a boundary between the corner and the second side and is orthogonal to the second side in the plan view, is a second imaginary straight line, and
the first imaginary straight line intersects the second imaginary straight line on the fourth inclined surface in the plan view.

8. The cutting insert according to claim 1, further comprising
a corner cutting edge located on the corner, wherein a height of the corner cutting edge from the reference plane increases as going away from the first side and the second side.

9. A cutting tool, comprising:
a holder having a bar shape extended from a first end toward a second end and comprising a pocket located on a side of the first end; and
the cutting insert according to claim 1, the cutting insert being located in the pocket.

10. A method for manufacturing a machined product, comprising:
rotating a workpiece;
bringing the cutting tool according to claim 9 into contact with the workpiece being rotated; and
moving the cutting tool away from the workpiece.

11. The cutting insert according to claim 1, wherein a width of the third inclined surface in a direction orthogonal to the bisector is larger than a width of the second inclined surface in a direction orthogonal to the bisector in a plan view of the first surface.

12. A cutting insert, comprising:
a first surface comprising a corner having a convex curvilinear shape in an outward direction, and a first side and a second side each being extended from the corner;
a second surface located on a side opposite to the first surface; and
a third surface located between the first surface and the second surface, wherein
an imaginary line passing through a center of the first surface and a center of the second surface is a central axis,
an imaginary plane, which is orthogonal to the central axis and is located between the first surface and the second surface, is a reference plane,
the first surface further comprises an inclined surface that approaches the reference plane as going away from the corner,
the inclined surface comprises
    a first inclined surface inclined at a first angle,
    a second inclined surface located farther from the corner than the first inclined surfaced and inclined at a second angle, and
    a third inclined surface located farther from the corner than the second inclined surface and inclined at a third angle,
the first inclined surface has a concave curvilinear shape in a cross section orthogonal to a bisector of the corner,
the second inclined surface is a flat surface,
the second angle is smaller than either of the first angle and the third angle in a cross section that includes the bisector and is orthogonal to the reference plane, and
a width of the third inclined surface in a direction along the bisector is larger than a width of the second inclined surface in the direction along the bisector in a plan view of the first surface;
the first surface further comprises a pair of recess parts by interposing therebetween the second inclined surface in a direction orthogonal to the bisector in a plan view of the first surface.

13. The cutting insert according to claim 12, wherein a length of the pair of recess parts in the direction along the bisector is larger than a length of the second inclined surface in the direction along the bisector in the plan view.

14. The cutting insert according to claim 12, wherein
the pair of recess parts comprises
    a first recess part, and
    a second recess part closer to the second side than the first recess part,
    an imaginary straight line, which passes through a boundary between the corner and the first side and is orthogonal to the first side in the plan view, is a first imaginary straight line, and
    the second recess part is located on the first imaginary straight line in the plan view.

15. A cutting tool, comprising:
a holder having a bar shape extended from a first end toward a second end and comprising a pocket located on a side of the first end; and
the cutting insert according to claim 12, the cutting insert being located in the pocket.

16. A method for manufacturing a machined product, comprising:
rotating a workpiece;
bringing the cutting tool according to claim 15 into contact with the workpiece being rotated; and
moving the cutting tool away from the workpiece.

17. The cutting insert according to claim 12, wherein a width of the third inclined surface in a direction orthogonal to the bisector is larger than a width of the second inclined surface in a direction orthogonal to the bisector in a plan view of the first surface.

18. The cutting insert according to claim 12, wherein
the inclined surface further comprises a fourth inclined surface which is located between the first inclined surface and the second inclined surface and is inclined at a fourth angle,
the fourth angle is smaller than the first angle and larger than the second angle in the cross section which includes the bisector and is orthogonal to the reference plane.

19. The cutting insert according to claim 18, wherein
an imaginary straight line, which passes through the boundary between the corner and the first side and is orthogonal to the first side in a plan view of the first surface, is a first imaginary straight line,
an imaginary straight line, which passes through a boundary between the corner and the second side and is orthogonal to the second side in the plan view, is a second imaginary straight line, and
the first imaginary straight line intersects the second imaginary straight line on the fourth inclined surface in the plan view.

20. The cutting insert according to claim 12, further comprising
a corner cutting edge located on the corner, wherein a height of the corner cutting edge from the reference plane increases as going away from the first side and the second side.

* * * * *